United States Patent Office 2,781,864
Patented Feb. 19, 1957

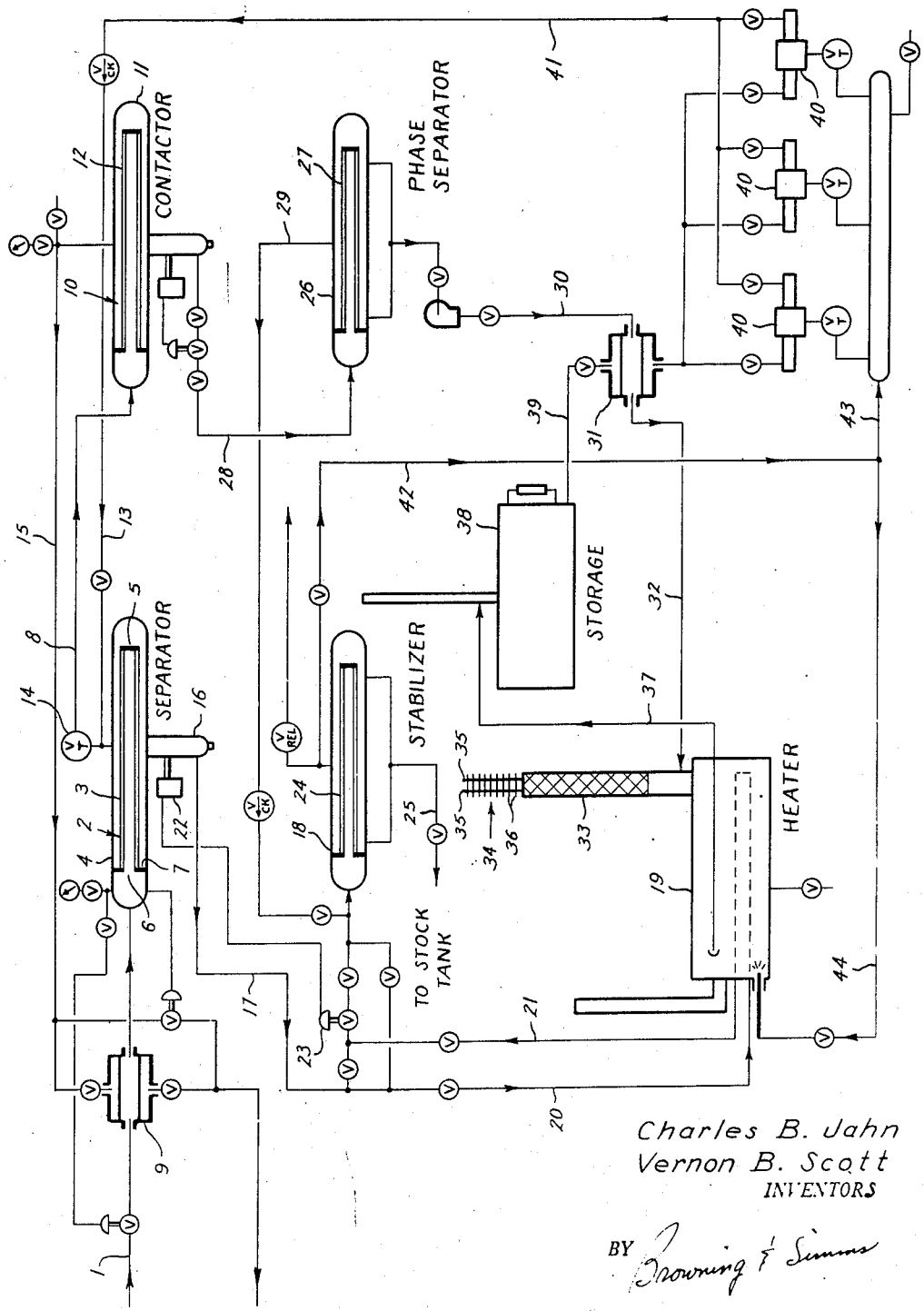

2,781,864

FLUID SEPARATION PROCESS

Charles B. Jahn and Vernon B. Scott, Houston, Tex.,
said Scott assignor to said Jahn Application December 27, 1952, Serial No. 328,185

7 Claims. (Cl. 183—121)

This invention relates to a process for separating a lighter fluid from admixture with a heavier fluid through the use of a body of porous synthetic resinous material. In one of its aspects, the invention relates to a process for reducing the water content of a gas by intimately contacting the gas with a liquid dehydrating agent, such contacting being accomplished by such a body of resinous materials. In still another of its aspects, this invention relates to a process for recovering liquefiable constituents from a gas stream containing the same.

In the field of fluid separation, there has been suggested many processes for effecting the separation of one fluid from its admixture with another fluid. For example, in the drying of air and other gases, it is common to contact the gas to be dried with a liquid dehydrating agent such as one of the glycols. In such a process, it has been found to be a problem to obtain sufficiently intimate contact between the dehydrating agent and the gas to be dried that the dehydrating agent will have the maximum opportunity to absorb water from the gas. A still further problem is the separation of the liquid dehydrating agent from the gas after such absorption has occurred and this is important in order to minimize the loss of the relatively expensive dehydrating agent. When the gas being dried is a natural gas of the hydrocarbon type, it is quite common to recover some of the liquefiable constituents of the natural gas during the process of drying the same prior to transmitting it to distribution pipelines. Such recovery is frequently effected by cooling the gas to condense the liquefiable hydrocarbons during the drying process and, hence, there is presented the problem of separating such condensed hydrocarbons from the remainder of the natural gas stream.

Related to the above drying processes are the processes of mechanically removing a fluid, such as water, entrained in another fluid, such as air or natural gas, by means of mechanical separation. In the past, such mechanical separation has been effected largely through the use of baffling and mist extractors which promote coalescence of the entrained particles into larger drop sizes which will, by gravity, drop out of the stream of flowing gas. Such prior art processes have been found to be relatively inefficient and usually will remove only entrained particles above a certain minimum size and will permit particles which are relatively small in size to remain in the stream. The prior art mechanical separators now in commercial use thus are limited to removing entrained liquids and do not materially effect the dissolved liquid or vapor content of the gas. Obviously, it would be desirable to possess a process which not only could remove substantially all of the entrained liquid, but which also could materially reduce the dissolved liquid or vapor content of the gas.

It is an object of this invention to provide an improved process for intimately contacting one fluid with another in which the contact is effected by passing a mixture of such fluids through a body of porous synthetic resinous material having myriads of capillary passages therethrough, and which particularly is comprised of a phenol-formaldehyde resin condensed from a fluid state to a solid while admixed with a clay mud.

Another object of this invention is to provide a process for separating one fluid from its admixture with another fluid by passing such admixture through such a body of resinous material thereby not only permitting the removal, for example, of entrained liquids from gases, but also permitting a material reduction in the quantity of such liquids dissolved in such gases without the necessity of condensing the dissolved liquids by cooling prior to their separation.

Another object of this invention is to provide a process for reducing the water content of a gas by contacting the gas with a liquid dehydrating agent, the contact being effected by passing an admixture of the gas and agent through a body of porous resinous material of the above-mentioned type thereby not only causing an intimate contact between the gas and agent to permit maximum absorption of water from the gas with a reduced amount of the agent, but also effecting a very efficient separation of the agent from the gas in the same operation without the necessity of supplying additional separator equipment for such purpose.

Another object is to provide such a process not only to dry a natural gas, for example, or other gaseous fluids containing liquefiable constituents but to also concomitantly separate some of such liquefiable constituents from such gas while the same is being contracted with the dehydrating agent.

Another object is to provide in such a process a novel step for efficiently separating the recovered constituent from the dehydrating agent.

Another object of this invention is to provide a process wherein a fluid is flashed from admixture with another fluid of lower vapor pressure while concomitantly separating the flashed vapor from the remaining liquid, such flashing and separating being accomplished with the aid of a body of porous plastic material of the above-mentioned type.

Another object of this invention is to provide a process for reducing the water content of a gas and, with a gas containing a liquefiable constituent, such as natural gas having a liquefiable hydrocarbon therein, to concomitantly recover such constituent, if desired, while drying the gas, wherein such a gas is in a first step passed through a body of resinous material of the above-mentioned type to reduce the water content and with a natural gas, to also remove a portion of the liquefiable hydrocarbon, and then in a second step the resulting gas is passed through a second body of such resinous material after a dehydrating agent has been injected into the effluent gas from the first step to not only intimately contact the gas with the agent but to also effect a separation of the agent after it has absorbed water from the gas and to effect a further separation of such liquefiable hydrocarbon from a gas containing the same, particularly where such gas has been cooled between the first and second steps.

Other objects, advantages and features of this invention will be apparent to one skilled in the art upon a consideration of the written specification, the appended claims, and the attached drawings, wherein there is shown a flow diagram illustrating not only the general process of this invention but also various aspects of it all as applied to the drying of a natural gas and the separation of a liquefiable hydrocarbon therefrom.

In accordance with this invention, it has been discovered that a body of synthetic resin of the type disclosed in and made in accordanc with the general disclosure of United States Letters Patent 2,546,624, issued March 27, 1951, to Robert S. Adams, can be efficiently employed to secure a separation of one fluid from another or, if desired, to not only secure such separation but to also intimately contact one fluid with another during the separation process.

Generally, the resinous body is formed by intimately admixing a partially condensed phenol-formaldehyde resin while still in a liquid phase with a clay mud. A resin found to be very suitable for the purposes of this invention is a phenol-formaldehyde thermosetting resin having the following properties:

(1) A viscosity of 30 to 40 seconds as measured on the Gardner-Holt scale,
(2) A density of 10.15 to 10.35 lbs. per gallon,
(3) A water miscibility of not more than fifteen percent but yet of appreciable magnitude,
(4) Percent solids of seventy-four to eighty as determined by the A. S. T. M. D-115-41 test method.

The clay found to be most suitable for admixture with such liquid resin is a bentonite mined in Arizona. For best results, the clay should be "chemically pure" in that it does not contain any constituents which form gas during the resin condensation reaction nor any constituents which deleteriously interfere with such condensation reaction. For the purpose of this specification and claims, such a clay will be termed "inert." The condensation reaction can be accelerated by admixing accelerators of the type well known to the art with the resin or with the resin-clay mud admixture. As disclosed in the above-mentioned prior patent, it is important that the liquid resin and the clay mud be of substantially the same density so that there will be little tendency for the two to separate from their intimate admixture during the condensation reaction. The mixture of resin and mud, along with the accelerator if used, is cast in a mold to yield the desired form of the body to be used and preferably such form is that of a hollow cylinder. The resin is then allowed to condense and such condensation, of course, can be hastened by raising its temperature. After the condensation reaction has been completed, the body is removed from its mold and preferably is washed free from the clay thereby leaving behind a porous body of synthetic resin. Bodies having various pore sizes and permeabilities can be made as discussed in the above identified patent, but should have a permeability within the range of 400 to 80,000 millidarcys and preferably within the range of 1,000 to 30,000 millidarcys. As will be fully apparent from the discussion below, the efficiency of the separation and contact effected by the resinous body will vary with the pore size and generally, the smaller the pore size, the more efficient will be the separation and contact. Of course, pore size is often limited by the permissible drop in fluid pressure across the body and hence the allowable pressure drop will dictate the pore size. Accordingly, the permissible pressure drop will be determinative to a large extent of the efficiency of the process of this invention. It has been found, however, that a pore size of about four microns will yield a very high efficiency consistent with reasonable pressure drop across the body of resinous material.

Referring now to the annexed drawing, there is illustrated a process employing the above-described resinous bodies for reducing the quantity of water in a natural gas stream and for recovering liquefiable hydrocarbons from such stream. It will be understood that the process described herein is merely illustrative of the concept of this invention, and that the apparatus shown in the process can be suitably rearranged to handle various types of feeds as will be discussed below.

In the drawing, a natural gas stream, such as from a well or pipeline, is passed through conduit 1 into a separating zone 2 containing a body of resinous material 3 of the type above described. Such body is suitably supported in a vessel 4 and is in the form of a hollow cylinder having an end 5 closed against fluid flow and another end 6 open to receive a gas from conduit 1. An annular bulkhead 7 divides vessel 4 to direct the flow of gas from conduit 1 through body 3 and thence out into the annulus between the body and vessel 4 thereby preventing communication between the upstream and downstream sides of the body except by passage therethrough. Upon flowing through body 3, the feed gas is separated into an effluent gas from which has been removed substantially all entrained liquids, such as hydrocarbons and water, and which has also had removed from it some of the dissolved liquids (those in true vapor form) found in the feed gas. In this manner, not only is substantially all of the entrained liquid removed but the dew point of the feed gas is actually reduced so that the effluent gas in conduit 8 is no longer completely saturated with water or with liquefiable hydrocarbons of the type removed in separating zone 2.

While the feed gas can usually be processed at the temperature existing in the well or the pipeline, it is preferable to cool the same prior to passing it through the separating zone in order to achieve a maximum reduction in water and liquefiable hydrocarbon content. Such cooling can be by means of a heat exchanger 9 through which the feed gas passes in indirect heat exchange with cooler product gas derived from a source indicated below.

After the feed gas has had its water content, and its content of the liquefiable hydrocarbons materially reduced in the separating zone, it is passed through conduit 8 to a combination contacting and separating zone 10 comprising a vessel 11 in which is disposed a resinous body 12 of the same general type as resinous body 3 in zone 2. The incoming gas in conduit 8 passes through body 12 in the same manner as the feed gas passes through the body 3 in separating zone 2. Prior to introduction of the gas in conduit 8 into the combination contacting and separating zone, a liquid dehydrating agent, such as one of the glycols, is injected thereinto as a liquid via conduit 13. Also, the effluent gas from separating zone 2 can be cooled to not only permit the dehydrating agent to more thoroughly remove water from the gas but to also enable a greater recovery of the desired liquefiable hydrocarbons. Such cooling can be by any suitable means but ordinarily it is preferred to use throttling valve 14 so that the gas is cooled by expansion between the separating and the combination contacting and separating steps. The dehydrating agent can be introduced into the effluent gas from separating zone 2 at any desired point upstream of body 12, and even can be injected directly into vessel 11 downstream of valve 14. However, it has been found convenient to inject the dehydrating agent upstream of throttling valve 14 to reduce the likelihood of solid hydrate formation in the gas due to its reduction in temperature at valve 14.

In the combination contacting and separating zone 10, the injected dehydrating agent is intimately contacted with the effluent gas from separator zone 2 during the passage of the gas and dehydrating agent through the pores of the resinous body. At the same time, the injected dehydrating agent, along with liquefied hydrocarbons where they are present, is separated from the gas so that upon emergence of the gas from the resinous body, it is substantially devoid of dehydrating agent and is ready for introduction via conduit 15 into a pipeline to conduct it to its point of consumption. As stated above, it is preferred to cool the inlet gas in many instances, and such cooling can be effected by passing the effluent gas in conduit 15 through heat exchanger 9, it being recalled that the temperature of this effluent gas in conduit 15 has been materially reduced by throttling across valve 14.

The liquid separated in separating zone 2 will comprise water and, in many instances, liquefied hydrocarbons. Such hydrocarbons and water will be saturated with lighter normally gaseous hydrocarbons, such as methane, and it is usually desired to stabilize such mixture. Such stabilization can be effected by removing the mixture of hydrocarbons and water from drain pot 16 via conduit 17 to a stabilizer 18. Prior to passing the mixture to the stabilizer, it can be passed in indirect heat exchange by means of conduits 20 and 21 with the dehydrating agent being regenerated in heater 19. The flow of liquid from pot 16 can be controlled by a liquid level controller 22 actuating a motor valve 23 so that a liquid head is maintained in the pot and gas is prevented from blowing through into the stabilizer. The stabilizer is operated at a pressure substantially below that of separating zone 2 and likewise that of contacting and separating zone 10 so that gases dissolved in liquid removed from these zones are permitted to flash in the stabilizer. Such flashing and separation of the flashed gases from the remaining liquid is accomplished by passing the admixture through a resinous body 24 disposed in stabilizer 18 in the same manner as bodies 3 and 12 are disposed in the separator zone 2 and the combination contacting and separating zone 10. As the flashing liquid and gases pass through the resinous body, a maximum of residual liquid is separated from the flashed gas, thereby permitting the removal of the latter in a condition of less than saturation with respect to the remaining liquid. In this manner, loss of residual liquid is minimized and the flashed gases comprise essentially those which are undesired in the residual liquid. The liquid from the stabilizer will ordinarily comprise water and hydrocarbons and this can be passed through conduit 25 to a stock tank to permit a phase separation of the same.

The liquids removed from the combination contacting and separating zone 10 will comprise dehydrating agent which has absorbed water from the gas stream as well as liquefied hydrocarbons. Such liquid stream can be passed to a liquid-liquid phase separation zone 26 in which is disposed a resinous body 27 in a manner similar to the disposition of the other resinous bodies above described. Thus, the liquid from zone 10 passes through a conduit 28 into and through body 27 and in so doing, the dehydrating agent and hydrocarbons are separated into droplets of sufficient size that rapid separation of the two constituents into separate phases is accomplished. The resulting hydrocarbon is removed through conduit 29 and can be passed to stabilizer 18 along with the liquid from separating zone 2 in order to remove dissolved gases therefrom. Of course, separate stabilizing zones can, if desired, be employed for each of the liquid effluents from zones 2 and 10.

The dehydrating agent from zone 26 is then passed to a suitable regeneration system for removing absorbed water therefrom so that it can be recirculated through zone 10. Such regeneration system can be of any conventional type and, in the instant embodiment of the process, there is illustrated a heater 19 which can be gas fired to vaporize water from the dehydrating agent therein. Thus, the dehydrating agent from zone 26 passes through conduit 30 and through heat exchanger 31 wherein it is heated by indirect heat exchange with hot regenerated dehydrating agent from heater 19. It then passes via conduit 32 into a stack 33 to drop into the body of heater 19. Stack 33 can comprise a packed tower having a condensing section 34 comprising conduits 35 communicating between the interior of the stack and the atmosphere and provided with suitable fins 36 to increase their heat exchange capacity. In this manner, the water boiled from the dehydrating agent in the body of heater 19 passes upwardly through stack 33 and, in so doing, any dehydrating agent also vaporized or carried over with the water is refluxed out in the packed section by reflux condensed in cooling section 34. The regenerated glycol from heater 19 passes via conduit 37 into a dehydrating agent storage tank 38 and thence via conduit 39 through heat exchanger 31, pumps 40, and conduit 41 back to conduit 13 and zone 10. Pumps 40 can be powered by a natural gas stream, such as the gas from stabilizer 18 passing through conduits 42 and 43 to the pumps. Likewise, the gas in the stabilizer can be employed to fire the burner in heater 19 by passage through conduit 44. Of course, any suitable means for raising the pressure of the dehydrating agent from that existing in the heater to that of the combination contacting and separating zone 10 can be employed. In regenerating the dehydrating agent, it is ordinarily desirable to reduce the pressure thereof to substantially atmospheric pressure not only to permit maximum removal of water but also to permit the use of a minimum temperature for regeneration so that thermal decomposition of the dehydrating agent is substantially avoided.

In addition to the natural gas discussed as a feed in the above exemplary description of the process of this invention, other feeds can be employed. Thus, air which is to be dried can be passed through separating zone 2 and thence into contact with a liquid dehydrating agent in the combination contacting and separating zone 10 or passed directly to the latter zone. Other gases containing water can also be dried. Further, it is possible to separate in a separator zone arranged similarly to zones 2, 10 or 26 in the drawing, a lighter fluid from its admixture with a heavier fluid. Thus, for example, a heavier hydrocarbon such as hexane can be separated from a lighter hydrocarbon such as propane in a gaseous phase in a manner similar to the separation of a liquefiable hydrocarbon from a natural gas stream as described above. It is not necessary that water be present in the feed to effect such separation, but it is necessary that the constituents to be separated be substantially immiscible in each other and that the lighter constituent at least approach saturation with the heavier constituent at the temperature of the separation. By this is meant to include the case where the heavier constituent can be liquefied upon passage through the resinous body while the lighter constituent is not, even though both constituents are commonly miscible when both are in liquid or gaseous phase. Thus, a liquid and a gas are considered immiscible in such instance as long as the liquid dissolved in the gas at least substantially saturates the same at the temperature of the separation and is of heavier molecular weight. Liquid phase separations between immiscible liquids can be made as discussed with reference to phase separator 26 above. Thus, certain water-in-oil type emulsions can be broken into separate phases upon passage through a body of porous resin formulated in accordance with this invention. In such operations, the separator is flooded, that is, the body of porous resinous material is maintained submerged in liquid.

In connection with the feed stocks usable in this invention, it should be noted that the resinous material of this invention is somewhat soluble in caustic alcoholic solutions having a pH above 12 and wherein the alcohol is highly concentrated. The plastic material can be treated with a silicone to coat the surface of the same, thereby making it resistant even to caustic alcoholic solutions. In general practice, it is preferred to so coat the body of resinous material to eliminate the possibility of its being dissolved by such substances.

The dehydrating agents usable in accordance with this invention are those which are liquid under the operating conditions of the combination contacting and separating zone 10. Among such agents may be mentioned diethylene glycol, triethylene glycol, methanol, mono-propylene glycol, and mono-ethylene glycol. Calcium chloride and other drying solutions are also usable. These agents are employed in concentrations conventional in the art and are regenerated by conventional methods. However, when using the liquid dehydrating agents in the process of this invention, it has been found that a much lower circulation rate can be maintained to secure an even greater drying efficiency than in conventional prior art processes such as those using bubble tray contactors, baffle mixers and centrifugal separators, and the like. Actual field tests have demonstrated that the circulation rate of the dehydrating agents, particularly the glycols, can be less than fifty percent of that required in commercial prior art processes. For example, in drying natural gas, it has been found that three to four gallons per hour of diethylene glycol per million feet of gas processed per day will result in an off-gas stream containing from three to four pounds of water vapor per million cubic feet of gas which is considerably less than the conventional contract requirement of a maximum of seven pounds per million cubic feet of gas.

The temperature at which the dehydrating agent is contacted with the gas in the combination contacting and separating zone 10 can be varied within relatively wide limits in the same manner as in prior art processes. However, it is preferred to make such contact at a temperature as low as possible in order that the dehydrating agent can absorb a larger percentage of the moisture existent in the gas and, when operating with natural gas, the temperature of contact is also desirably low as possible in order to secure a maximum recovery of the desired liquefiable hydrocarbons. On such natural gas streams, the temperature in the contacting zone will ordinarily be from about 10° F. below zero to 20° or 25° F. when cooling of the gas by an expansion valve is employed.

In the same manner, the temperature within separator zone 2 is likewise maintained at a minimum and yet above that at which any solids, such as ice or hydrates, may be formed in the gas stream. Generally, the lower the temperature in the separating zone, the more efficient will be the separation. The exact temperature employed will be dependent upon the nature of the feed stream and of the constituents to be removed as liquids. Natural gas temperatures of around 90° F. have been found to be satisfactory. However, it is usually desirable to lower the temperature of the inlet gas to within 5° or 6° of the solid hydrate formation temperature of the gas before passing it through the separator zone. This assures a minimum temperature existent within the separation zone consistent with avoiding clogging the resinous body with solid hydrates. As stated above, the separator is efficient in not only removing moisture or other liquids entrained in a gas stream but also has been found to be able to actually remove some of such liquids which exist in a true vapor state in the gas stream. For example, it is possible to lower the dew point of air which approaches saturation below the saturation point at the temperature obtaining in the separator zone. Efficiencies for the separator zone have been found to commonly be within the range of ninety-five to ninety-eight percent, such efficiencies being expressed as the ratio of the total water removed in the separation zone to the total water content of the inlet gas. Such separation efficiencies hold even for saturated gaseous streams containing no liquid in true liquid form. The efficiency achieved in contacting zone 10 when using diethylene glycol as the dehydrating agent has been found to be a 60° dew point depression or better. Dew point depressions in excess of 100° when treating natural gas have been achieved.

The drying efficiency of the combination separator zone and contactor zone is dependent, of course, upon the intimacy of contact between the gas and dehydrating agent and this in turn is governed to a large extent by the porosity or permeability of the resinous body. Generally, the smaller the size of the pores in the resinous body, the greater will be the contacting efficiency. One factor which limits the size of the pores is the permissible pressure drop across the resinous body. Ordinarily, these resinous bodies are made up in hollow cylinders having a wall thickness ranging from one-half to one inch or more. Bodies having sufficient porosity that only one-half pound per square inch of pressure drop thereacross have been found to be operable, both in the separation and the combination contacting and separation zones and, due primarily to the strength limitations of the plastic material, a maximum pressure drop of fifty pounds per square inch across the resinous bodies has been found to be a practical upper limit. In constructing a resinous body for use in any particular situation, it is preferred to make the pore size thereof a minimum to give the pressure drop which is considered to be acceptable in operation. With such construction, the operating efficiency of the unit will also be at a maximum. The exact pore size for use in any given particular situation can be determined by mere routine test.

The theory of operation of the resinous bodies of this invention in accomplishing their separating and contacting functions has not been fully formulated. It has been observed that each of the pores in the resinous body comprises a series of elliptically shaped openings joined together at their smaller ends by restricted throats. As a result, fluid flowing through these pores is in all probability subjected to alternate acceleration and deceleration of velocity. Also, it is known that the plastic body is preferentially wet by hydrocarbons with respect to glycols and water and that the bodies eventually have their surfaces covered with a layer of hydrocarbons. In the absence of hydrocarbons, the surfaces of the body are preferentially coated with glycol with respect to water. It is presumed that such quantity of liquid being separated will accumulate in the elliptically shaped chambers that it will eventually plug the throats between adjoining elliptical chambers. This hinders or prevents further flow of gas through the particular pore so plugged, and, when sufficient of the pores have become thus plugged, the resulting build-up in pressure differential across the resinous body causes the gas to blow the liquids out of the small throats into the next elliptical chamber, resulting in a very intimate contact between the gas and the liquids. This type of action can be termed "capillary condensation." In any event, whether this theory be the true one or not, the passage of a fluid containing both light and heavy molecules through the resinous bodies of this invention results not only in an intimate contact between the heavy and light molecules but also in a separation of the heavy molecules from the light molecules.

From the foregoing it will be seen that this invention is one well adapted to attain all of the ends and objects hereinabove set forth, together with other advantages which are obvious and which are inherent to the process.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A process for continuously contacting a stream of gas with a stream of liquid and for separating the liquid from the gas comprising the steps of admixing said streams of gas and liquid; providing a porous body having chains of interconnected pores therein forming flow passages from one side of the body to another side thereof, said pores being of a size that said liquid can collect therein and temporarily bridge across the pores to be blown by said gas from pore to pore in said chains thereof; flowing the admixed streams through the porous body from said one side thereof to said another side, collecting liquid in said pores from said admixed streams while the latter are flowing through the body, said liquid being so collected in sufficient quantity that it will temporarily bridge across at least some of the pores as aforesaid, and blowing said collected liquid by said gas from pore to pore to move it through said porous body in intimate contact with said gas; withdrawing a stream of gas from said another side of said porous body, and also withdrawing a separate stream of said liquid from said another side.

2. A process for decreasing the water content of a natural gas stream and recovering desirable liquefiable hydrocarbons contained in such natural gas stream which comprises the steps of passing said natural gas stream through a first body of synthetic resin, withdrawing from said first body a gas stream and a separate liquid stream comprising a mixture of water and hydrocarbons, injecting into the gas stream withdrawn from said first body a liquid dehydrating agent having a capacity to absorb water from said withdrawn gas stream and which is substantially immiscible with hydrocarbons in said withdrawn gas stream, passing the resulting admixture at a temperature above the solid hydrate formation temperature of said admixture into a second body of synthetic resin and therein intimately contacting said withdrawn gas stream with said dehydrating agent and then separating liquefiable hydrocarbons from said withdrawn gas stream, each of said first and second body of synthetic resin comprising a porous synthetic resin having a permeability within the range of 400 to 80,000 millidarcys, each of said first and second body being a condensed phenol-formaldehyde resin; recovering a denuded and dried natural gas from said second body; and recovering hydrocarbons in a liquid form from said second body as a stream separate from said denuded and dried natural gas.

3. The process of claim 1 wherein said body comprises a condensed thermosetting phenol-formaldehyde resin, said body having a permeability within the range of 400 to 80,000 millidarcys.

4. A process for reducing the water content of a gas which comprises the steps of passing the gas through a resinous body in a separator zone, said body comprising a porous synthetic resin having a permeability within the range of 400 to 80,000 millidarcys, said body being a condensed thermosetting phenol-formaldehyde resin; removing water in a liquid state from said separator zone; injecting a liquid dehydrating agent into the resulting gas from said separator zone; passing the resulting admixture through a body of said resin in a contacting and separating zone; separately recovering gas having a reduced water content and said dehydrating agent containing absorbed water from said body in said contacting and separating zone.

5. The process of claim 4 wherein said dehydrating agent is selected from the group consisting of diethylene glycol, triethylene glycol, methyl alcohol, mono-propylene glycol and mono-ethylene glycol.

6. A process for reducing the water content of and recovering liquefiable hydrocarbons from a natural gas stream which comprises passing such a stream through a resinous body in a separator zone, said body comprising a porous synthetic resin having a permeability within the range of 400 to 80,000 millidarcys, said body being a condensed thermosetting phenol-formaldehyde resin; removing a stream of water and hydrocarbons from said body in said separator zone; injecting a liquid dehydrating agent into the resulting gas from said separator zone; passing the resulting admixture of gas and agent through a body of said resin in a contacting and separating zone; separately recovering gas having a reduced water content and a mixture of hydrocarbons and dehydrating agent from said body in said contacting and separating zone; passing the last said mixture through a body of said resin in a third zone; and separately recovering the dehydrating agent and hydrocarbons from said body in said third zone.

7. The process of claim 6 wherein the water and hydrocarbons recovered from said separator zone and the hydrocarbons recovered from said third zone are flash stabilized by passing through a body of said resin at a pressure substantially less than the pressures of said separator zone and said contacting and separating zone.

References Cited in the file of this patent

UNITED STATES PATENTS

| 2,546,624 | Adams | Mar. 27, 1951 |
| 2,573,964 | Green et al. | Nov. 6, 1951 |
| 2,601,009 | Swearinger | June 17, 1952 |
| 2,638,179 | Yard | May 12, 1953 |

OTHER REFERENCES

Dehydration . . . Maintenance, by R. A. Carter, the Oil Weekly, July 21, 1941, pages 29 to 33.